(12) United States Patent
Mei et al.

(10) Patent No.: US 11,963,483 B1
(45) Date of Patent: Apr. 23, 2024

(54) STRAW CRUSHING DEVICE CAPABLE OF DRIVING SHARPENING STRUCTURE

(71) Applicant: Institute of Environment and Sustainable Development in Agriculture, CAAS, Beijing (CN)

(72) Inventors: Xurong Mei, Beijing (CN); Lili Gao, Beijing (CN); Daozhi Gong, Beijing (CN); Weiping Hao, Beijing (CN); Haoru Li, Beijing (CN); Xuemin Hou, Beijing (CN); Xiaojie Li, Beijing (CN)

(73) Assignee: Institute of Environment and Sustainable Development in Agriculture, CAAS, Beijing (CN)

( * ) Notice: Subject to any disclaimer, the term of this patent is extended or adjusted under 35 U.S.C. 154(b) by 0 days.

(21) Appl. No.: 18/391,050

(22) Filed: Dec. 20, 2023

(30) Foreign Application Priority Data

Dec. 26, 2022 (CN) .......................... 202211670259.8

(51) Int. Cl.
| | |
|---|---|
| A01F 29/22 | (2006.01) |
| A01F 29/02 | (2006.01) |
| B02C 18/16 | (2006.01) |
| B02C 23/28 | (2006.01) |

(52) U.S. Cl.
CPC ............ *A01F 29/22* (2013.01); *A01F 29/025* (2013.01); *B02C 18/16* (2013.01); *B02C 23/28* (2013.01)

(58) Field of Classification Search
CPC ...... A01F 29/22; A01F 29/005; A01F 29/025; B02C 23/28; B02C 18/16
See application file for complete search history.

(56) References Cited

U.S. PATENT DOCUMENTS

| | | | | |
|---|---|---|---|---|
| 3,370,628 | A * | 2/1968 | Waldrop | A01F 29/22 451/423 |
| 3,677,316 | A * | 7/1972 | Markham | A01D 75/08 56/250 |
| 3,751,859 | A * | 8/1973 | Pedersen | A01D 75/08 451/421 |
| 3,867,808 | A * | 2/1975 | Kidd | B02C 18/186 56/DIG. 1 |

(Continued)

FOREIGN PATENT DOCUMENTS

| | | |
|---|---|---|
| CN | 101757961 A | 6/2010 |
| CN | 103521326 A | 1/2014 |

(Continued)

*Primary Examiner* — Faye Francis
(74) *Attorney, Agent, or Firm* — Kirk A. Wilson; Joseph T. Guy; Patent Filing Specialist Inc.

(57) ABSTRACT

Disclosed is a straw crushing device capable of driving a sharpening structure, relating to the field of straw crushing. The straw crushing device includes a main housing, the main housing is internally provided with a crushing chamber and a suction chamber, a feeding nozzle is installed outside the main housing, and the feeding nozzle communicates with a feeding end of the crushing chamber. A spline transmission shaft is installed inside the main housing, and penetrates through the crushing chamber and the suction chamber. A driving motor is installed outside the main housing, and the driving motor is connected to the spline transmission shaft. A Y-shaped tool rest is installed on the spline transmission shaft, and the Y-shaped tool rest is located in the crushing chamber.

4 Claims, 4 Drawing Sheets

(56) References Cited

U.S. PATENT DOCUMENTS

| | | | | | |
|---|---|---|---|---|---|
| 4,031,670 | A | * | 6/1977 | Murphy | B24B 3/363 |
| | | | | | 451/423 |
| 4,319,718 | A | * | 3/1982 | Snavely | A01D 75/08 |
| | | | | | 241/222 |
| 4,503,643 | A | * | 3/1985 | Johnson | B26D 7/12 |
| | | | | | 83/174.1 |
| 5,098,027 | A | * | 3/1992 | McClure | B24B 3/368 |
| | | | | | 451/421 |
| 5,172,521 | A | * | 12/1992 | McClure | B24B 3/55 |
| | | | | | 451/419 |
| 6,430,909 | B1 | * | 8/2002 | Clauss | A01F 29/22 |
| | | | | | 56/250 |
| 6,503,135 | B2 | * | 1/2003 | Clauss | A01F 29/22 |
| | | | | | 451/421 |
| 7,146,788 | B2 | * | 12/2006 | Wolf | A01F 29/22 |
| | | | | | 56/504 |
| 7,533,516 | B2 | * | 5/2009 | Pollklas | A01F 29/22 |
| | | | | | 56/250 |
| 2005/0124263 | A1 | * | 6/2005 | Clauss | A01F 29/22 |
| | | | | | 451/163 |
| 2012/0293157 | A1 | * | 11/2012 | Loebe | A01D 43/085 |
| | | | | | 324/71.1 |
| 2013/0316770 | A1 | * | 11/2013 | Haycocks | A01F 29/22 |
| | | | | | 460/22 |
| 2014/0215985 | A1 | * | 8/2014 | Pollklas | A01D 43/085 |
| | | | | | 56/10.2 R |
| 2021/0078128 | A1 | * | 3/2021 | Willems | A01F 29/22 |

FOREIGN PATENT DOCUMENTS

| | | | | |
|---|---|---|---|---|
| CN | 209632654 U | | 11/2019 | |
| DE | 3841829 A1 | * | 7/1989 | A01F 29/22 |
| DE | 19828766 C1 | * | 11/1999 | A01F 29/22 |
| DE | 102017201423 A1 | * | 8/2018 | A01F 29/22 |
| EP | 3769607 A1 | * | 1/2021 | A01F 29/22 |
| GB | 2025285 A | * | 1/1980 | A01D 75/08 |

\* cited by examiner

STRAW CRUSHING DEVICE CAPABLE OF DRIVING SHARPENING STRUCTURE

CROSS-REFERENCE TO RELATED APPLICATION

This patent application claims the benefit and priority of Chinese Patent Application No. 202211670259.8, filed with the China National Intellectual Property Administration on Dec. 26, 2022, the disclosure of which is incorporated by reference herein in its entirety as part of the present application.

TECHNICAL FIELD

The present disclosure relates to the technical field of straw crushing, and in particular to a straw crushing device capable of driving a sharpening structure.

BACKGROUND

Straw is the main by-product of crops, and is also an important biological resource of industry and agriculture. Crop straw, which is rich in nutrition, can be used as fertilizer, feed, domestic fuel and raw materials for industrial production. A large amount of surplus straw is actually a huge resource that has been burned without being used. It is of great practical and strategic significance for a country with a large population and relatively short agricultural resources to comprehensively utilize crop straw, turn waste into treasure and turn harm into benefit.

After the existing straw crushing device is used for a period of time, the blade is prone to wear, leading to the dullness of the blade and affecting the straw crushing effect; the blade needs to be dismounted by management staff for grinding to make the blade keep sharp again. Due to the thickness change, the ground blade needs to be adjusted when installed, which is cumbersome and consumes a lot of time, and thus affects the efficiency of straw crushing treatment.

SUMMARY

In view of this, a straw crushing device capable of driving a sharpening structure is provided by the present disclosure, so as to solve the problems that the blade is prone to wear after the existing straw crushing device is used for a period time, leading to the dullness of the blade and affecting the straw crushing effect, and the blade needs to be disassembled by the management staff for grinding, which is cumbersome and affects the efficiency of straw crushing treatment.

A straw crushing device capable of driving a sharpening structure provided by the present disclosure specifically includes a main housing. The main housing is internally provided with a crushing chamber and a suction chamber, a feeding nozzle is installed outside the main housing, and the feeding nozzle communicates with a feeding end of the crushing chamber. A spline transmission shaft is installed inside the main housing, and penetrates through the crushing chamber and the suction chamber. A driving motor is installed outside the main housing, and is connected to the spline transmission shaft. A Y-shaped tool rest is installed on the spline transmission shaft, and is located in the crushing chamber. A crushing blade is installed on the Y-shaped tool rest, and is attached to an inner wall of the crushing chamber. An impeller is installed on the spline transmission shaft, and is located in the suction chamber. A guide frame is installed on an outer side of the main housing, and a movable assembly plate is installed inside the guide frame. A sharpening stone is installed on one side of the movable assembly plate, and an edge of the sharpening stone is chamfered. An adjusting nut is installed on the movable assembly plate.

Further, the Y-shaped tool rest is rotatably connected into the crushing chamber, three crushing blades are fixedly connected to the Y-shaped tool rest by bolts in an annular manner, and are in slide contact with the inner wall of the crushing chamber. One side of each crushing blade is sharp, and the other side of the crushing blade is chamfered Further, the main housing is internally provided with a discharge channel, and a discharge end at the bottom of the crushing chamber communicates with a feeding end of the suction chamber by means of the discharge channel.

Further, the impeller is rotatably connected into the suction chamber.

Further, an outer side of the crushing chamber is provided with a movable opening, and the guide frame is located at the movable opening. Three slide holes are arranged in the guide frame in a line, and two guide slide bars are arranged on one side of the movable assembly plate. The guide slide bars are slidably connected into the sliding holes, and the sharpening stone slides in the movable opening.

Further, one side of the movable assembly plate is provided with a screw, the screw penetrates through the slide hole, and the screw is sleeved with a spring B. One end of the spring B is in contact with the movable assembly plate, and the other end of the spring B is in contact with an inner side of the guide frame. The adjusting nut is threaded to the external of the screw, and the adjusting nut is in contact with an outer side of the guide frame.

Further, the center of the Y-shaped tool rest is provided with a spline movable hole, and the Y-shaped tool rest is slidingly connected to the spline transmission shaft by means of the spline movable hole.

Further, the spline transmission shaft is sleeved with a spring A, and the spring A is located in the crushing chamber. One end of the spring A is in contact with the Y-shaped tool rest, and the other end of the spring A is in contact with the spline transmission shaft.

The present disclosure has the following beneficial effects:

1. When straw enters the feeding end of the crushing chamber via the feeding nozzle, the driving motor drives the crushing blades inside the crushing chamber to rotate, so as to achieve straw crushing treatment by means of the crushing blades. When the crushing blades are used for straw crushing treatment, the driving motor drives the impeller inside the suction chamber to rotate synchronously, the crushed straw inside the crushing chamber is pumped by the impeller into the suction chamber via the discharge channel, and the crushed straw is blown far away through the discharge end of the suction chamber, thus preventing the crushed straw from accumulating near the device to affect the subsequent operation effect of the device.

2. After the crushing blade becomes dull after long-term use, the adjusting nut is twisted with a wrench, the guide frame, influenced by the thrust of the spring B, drives the sharpening stone to move inwards, making the sharpening stone slightly protrude from the movable opening. The driving motor drives the crushing blade to rotate reversely, and the three crushing blades are ground by the sharpening stone to keep sharp, so as to guarantee the straw crushing effect. The blade does not need to be replaced frequently, and thus the use is simpler and more convenient. After the crushing blade is completely ground, the adjusting nut is twisted reversely with the wrench, the guide frame drives the sharpening stone to move outwards to completely enter the movable opening, thus preventing the sharpening stone from hindering the forward rotation of the crushing blade. When the crushing blade rotates reversely for grinding, a chamfer portion of the crushing blade is in contact with a chamfer portion at the edge of the sharpening stone, and the Y-shaped tool rest is pushed to move reversely to prevent the occurrence of blade collision. After the grinding of the crushing blade is finished, the thickness of the crushing blade is reduced, the spring A is used to apply thrust to the Y-shaped tool rest, the Y-shaped tool rest is forced to move, such that the crushing blade can always keep in close contact with the inner wall of the crushing chamber, and the crushing effect of the crushing blade on the straw is guaranteed.

BRIEF DESCRIPTION OF THE DRAWINGS

To describe the technical solutions in the embodiments of the present disclosure, the following briefly introduces the accompanying drawings of the embodiments.

The accompanying drawings in the following description only relate to some embodiments of the present disclosure, rather than limiting the present disclosure.

In the accompanying drawings:

FIG. 1 is a schematic structural diagram of a front axle side of a straw crushing device capable of driving a sharpening structure according to an embodiment of the present disclosure;

FIG. 2 is a schematic structural diagram of a rear axle side of a straw crushing device capable of driving a sharpening structure according to an embodiment of the present disclosure;

FIG. 3 is a schematic diagram of an installation structure of a spline transmission shaft inside the main housing according to an embodiment of the present disclosure;

FIG. 4 is a schematic diagram of a sectional structure of a main housing according to an embodiment of the present disclosure;

FIG. 5 is a schematic diagram of a connection structure of a spline transmission shaft and a Y-shaped tool rest according to an embodiment of the present disclosure;

FIG. 6 is a schematic diagram of a breakdown structure of a Y-shaped tool rest and a crushing blade according to an embodiment of the present disclosure;

FIG. 7 is a schematic diagram of a connection structure of a guide frame and a movable assembly plate according to an embodiment of the present disclosure;

FIG. 8 is a schematic diagram of a breakdown structure of a guide frame and a movable assembly plate according to an embodiment of the present disclosure.

Figure 1:
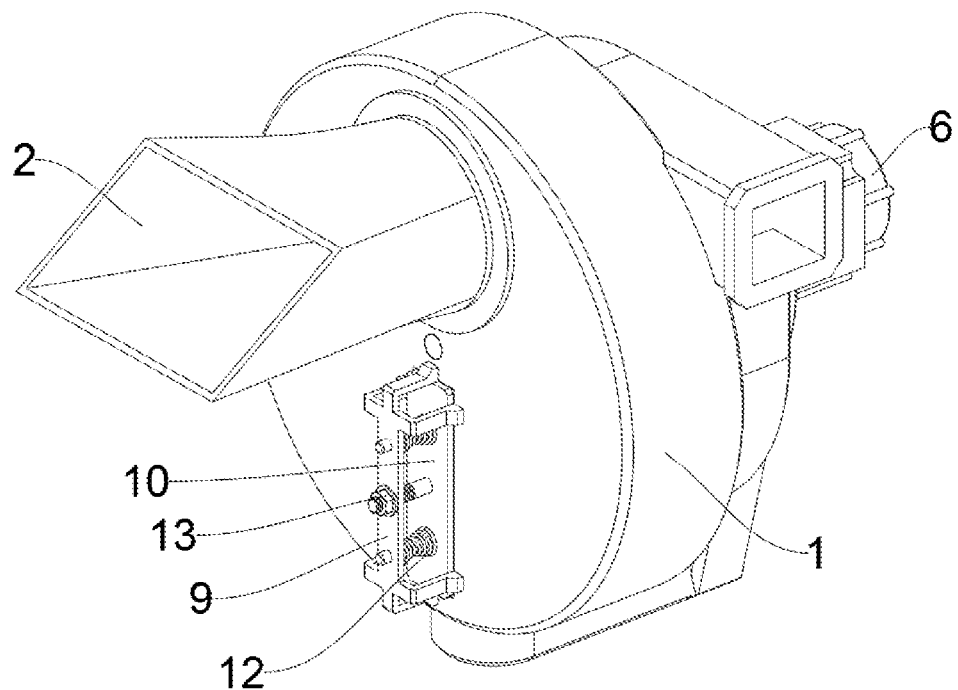

In the drawings:
1—main housing; 101—crushing chamber; 1011—movable opening; 102—discharge channel; 103—suction chamber; 2—feeding nozzle; 3—spline transmission shaft; 4—Y—shaped tool rest; 401—spline movable hole; 5—crushing blade; 6—driving motor; 7—spring A; 8—impeller; 9—guide frame; 901—slide hole; 10—movable assembly plate; 1001—guide slide bar; 1002—screw; 11—sharpening stone; 12—spring B; 13—adjusting nut.

DETAILED DESCRIPTION OF THE EMBODIMENTS

Figure 2:
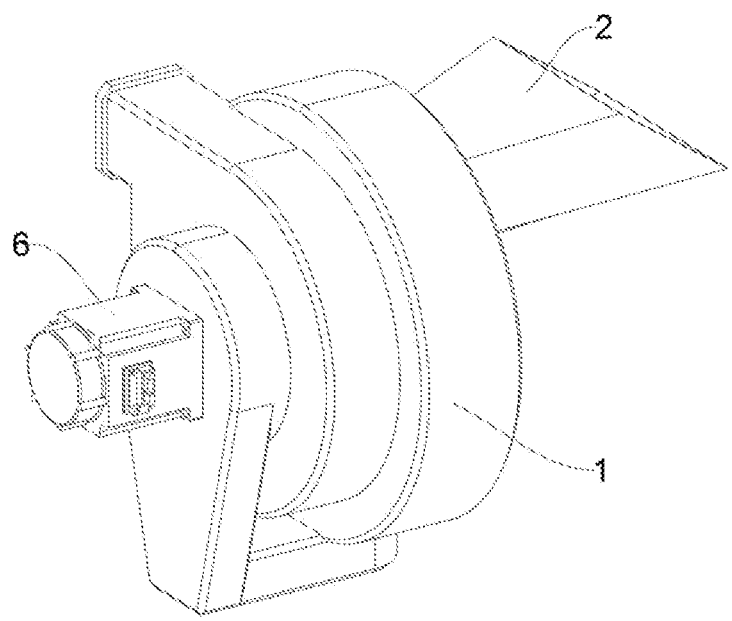
Figure 3:
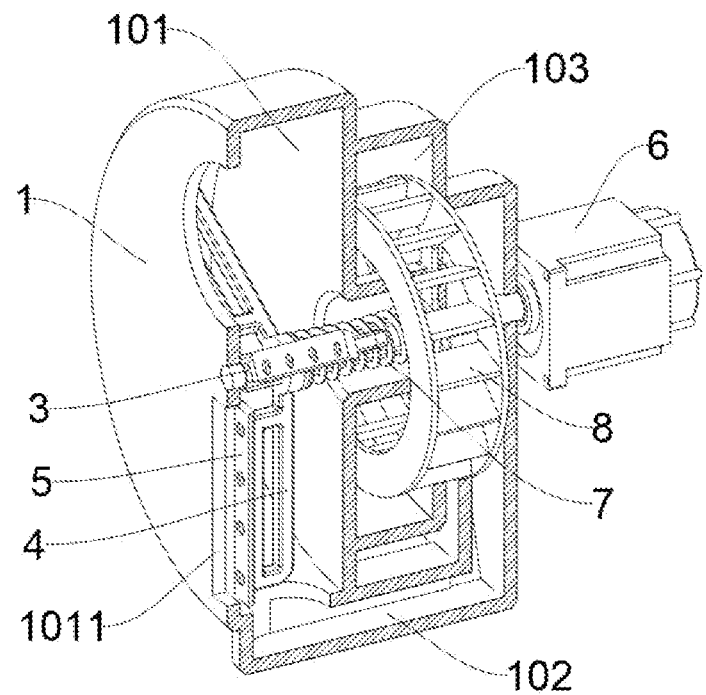
Figure 4:
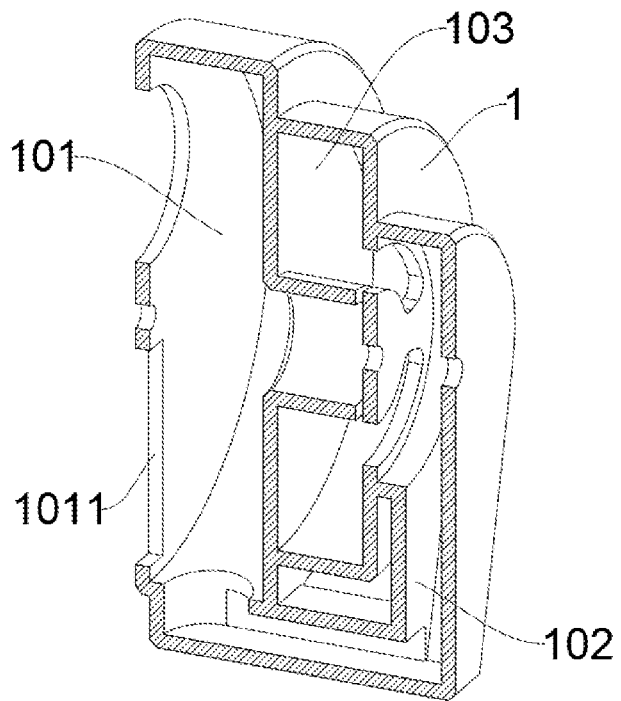
Figure 5:
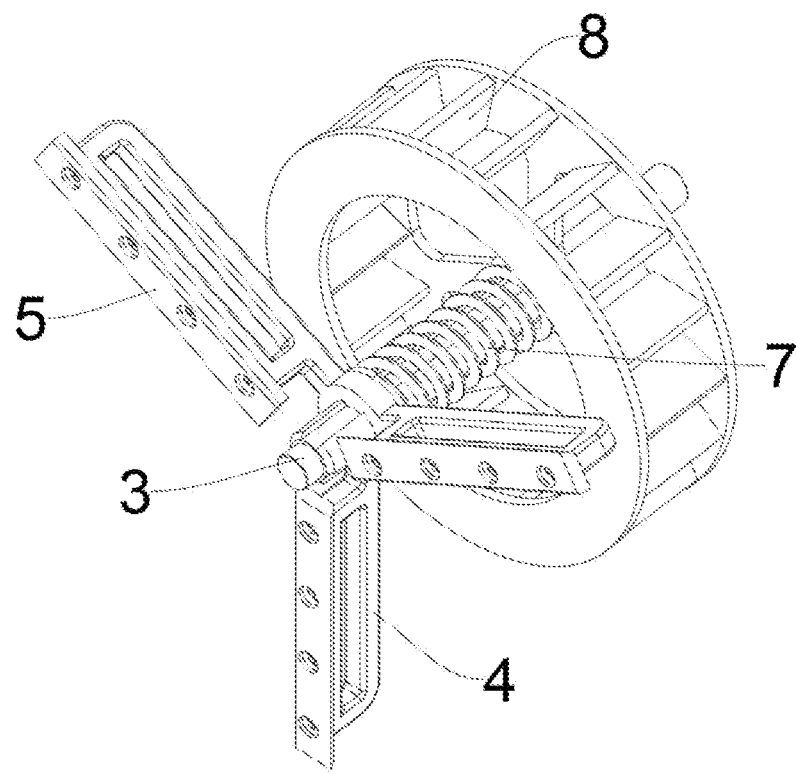
Figure 6:
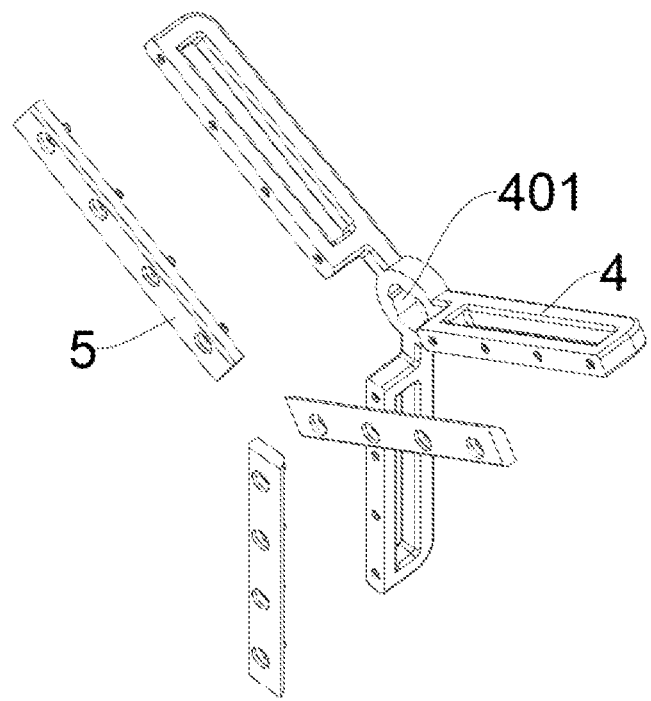
Figure 7:
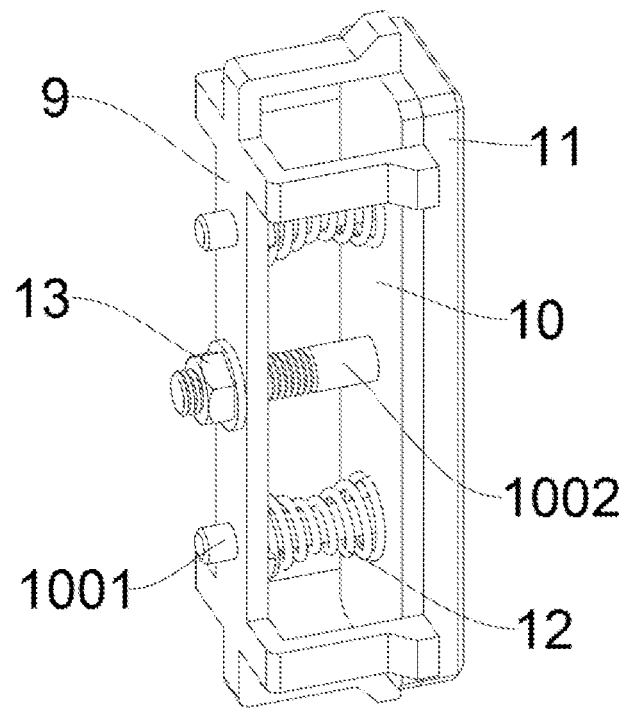
Figure 8:
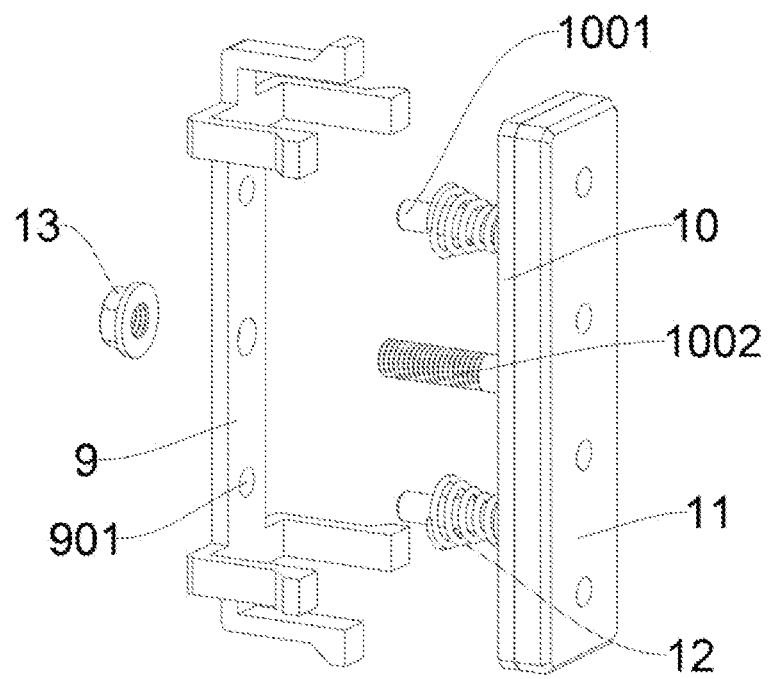

Embodiment: Please Referring to FIG. 1 to FIG. 8

A straw crushing device capable of driving a sharpening structure is provided by the present disclosure, including a main housing 1. The main housing 1 is internally provided with a crushing chamber 101 and a suction chamber 103, and a feeding nozzle 2 is installed outside the main housing 1. The feeding nozzle 2 communicates with a feeding end of the crushing chamber 101. A spline transmission shaft 3 is installed inside the main housing 1, and penetrates through the crushing chamber 101 and the suction chamber 103. A driving motor 6 is installed outside the main housing 1, and is connected to the spline transmission shaft 3. A Y-shaped tool rest 4 is installed on the spline transmission shaft 3, and is located in the crushing chamber 101. Crushing blades 5 are installed on the Y-shaped tool rest 4, and are attached to an inner wall of the crushing chamber 101. The Y-shaped tool rest 4 is rotatably connected into the crushing chamber 101, and three crushing blades 5 are fixedly connected to the Y-shaped tool rest 4 by bolts in an annular manner. The crushing blades 5 are in slide contact with the inner wall of the crushing chamber 101, one side of each crushing blade 5 is sharp, and the other side of the crushing blade 5 is chamfered. When straw enters the feeding end of the crushing chamber 101 via the feeding nozzle 2, the driving motor 6 drives the crushing blades 5 inside the crushing chamber 101 to rotate, so as to achieve straw crushing treatment by means of the crushing blades 5. The main housing 1 is internally provided with a discharge channel 102, and a discharge end at the bottom of the crushing chamber 101 communicates with a feeding end of the suction chamber 103 by means of the discharge channel 102. An impeller 8 is installed on the spline transmission shaft 3, and located in the suction chamber 103. The impeller 8 is rotatably connected into the suction chamber 103. When the crushing blades 5 are used for straw crushing treatment, the driving motor 6 drives the impeller 8 inside the suction chamber 103 to rotate synchronously, the crushed straw inside the crushing chamber 101 is pumped by the impeller 8 into the suction chamber 103 via the discharge channel 102, and the crushed straw is blown far away through the discharge end of the suction chamber 103, thus preventing the crushed straw from accumulating near the device to affect the subsequent operation effect of the device. A guide frame 9 is installed on an outer side of the main housing 1, and a movable assembly plate 10 is installed inside the guide frame 9. A sharpening stone 11 is installed on one side of the movable assembly plate 10, and an edge of the sharpening stone 11 is chamfered. An adjusting nut 13 is installed on the movable assembly plate 10.

An outer side of the crushing chamber 101 is provided with a movable opening 1011, and the guide frame 9 is located at the movable opening 1011. Three slide holes 901 are arranges inside the guide frame 9 in a line. One side of the movable assembly plate 10 is provided with two guide slide bars 1001, and the guide slide bars are slidingly connected into the slide holes 901. The sharpening stone 11 slides in the movable opening 1011. One side of the movable assembly plate 10 is provided with a screw 1002, the screw 1002 penetrates through the slide hole 901, and is sleeved with a spring B 12. One end of the spring B 12 is in contact with the movable assembly plate 10, and the other end of the spring B 12 is in contact with an inner side of the guide frame 9. The adjusting nut 13 is threaded to the outside of the screw 1002, and the adjusting nut 13 is in contact with an outer side of the guide frame 9.

By adopting the above technical solution, after the crushing blade 5 becomes dull after long-term use, the adjusting nut 13 is twisted with a wrench, the guide frame 9, influenced by the thrust of the spring B 12, drives the sharpening stone 11 to move inwards, making the sharpening stone 11 slightly protrude from the movable opening 1011. The driving motor 6 drives the crushing blade 5 to rotate reversely, and the three crushing blades 5 are ground by the sharpening stone 11 to keep sharp, so as to guarantee the straw crushing effect. The blade does not need to be replaced frequently, and thus the use is simpler and more convenient. After the crushing blade 5 is completely ground, the adjusting nut 13 is twisted reversely with the wrench, the guide frame 9 drives the sharpening stone 11 to move outwards to completely enter the movable opening 1011, thus preventing the sharpening stone 11 from hindering the forward rotation of the crushing blade 5.

The center of the Y-shaped tool rest 4 is provided with a spline movable hole 401, and the Y-shaped tool rest 4 is slidingly connected to the spline transmission shaft 3 by means of the spline movable hole 401. The spline transmission shaft 3 is sleeved with a spring A 7, and the spring A 7 is located in the crushing chamber 101. One end of the spring A 7 is in contact with the Y-shaped tool rest 4, and the other end of the spring A 7 is in contact with the spline transmission shaft 3.

By adopting the technical solution, when the crushing blade 5 rotates reversely for grinding, a chamfer portion of the crushing blade 5 is in contact with a chamfer portion at the edge of the sharpening stone 11, and the Y-shaped tool rest 4 is pushed to move reversely to prevent the occurrence of blade collision. After the grinding of the crushing blade 5 is finished, the thickness of the crushing blade 5 is reduced, the spring A 7 is used to apply thrust to the Y-shaped tool rest 4, the Y-shaped tool rest 4 is forced to move, such that the crushing blade 5 can always keep in close contact with the inner wall of the crushing chamber 101, and the crushing effect of the crushing blade 5 on the straw is guaranteed.

The specific use mode and effect of the embodiment are as follows: in the present disclosure, the straw enters the feeding end of the crushing chamber 101 via the feeding nozzle 2, the driving motor 6 drives the crushing blades 5 inside the crushing chamber 101 to rotate, so as to achieve straw crushing treatment by means of the crushing blades 5. When the crushing blades 5 are used for straw crushing treatment, the driving motor 6 drives the impeller 8 inside the suction chamber 103 to rotate synchronously, the crushed straw inside the crushing chamber 101 is pumped by the impeller 8 into the suction chamber 103 via the discharge channel 102, and the crushed straw is blown far away through the discharge end of the suction chamber 103, thus preventing the crushed straw from accumulating near the device to affect the subsequent operation effect of the device. When the crushing blade 5 becomes dull after long-term use, the adjusting nut 13 is twisted with a wrench, the guide frame 9, influenced by the thrust of the spring B 12, drives the sharpening stone 11 to move inwards, making the sharpening stone 11 slightly protrude from the movable opening 1011. The driving motor 6 drives the crushing blade 5 to rotate reversely, and the three crushing blades 5 are ground by the sharpening stone 11 to keep sharp, so as to guarantee the straw crushing effect. The blade does not need to be replaced frequently, and thus the use is simpler and more convenient. After the crushing blade 5 is completely ground, the adjusting nut 13 is twisted reversely with the wrench, the guide frame 9 drives the sharpening stone 11 to move outwards to completely enter the movable opening 1011, thus preventing the sharpening stone 11 from hindering the forward rotation of the crushing blade 5. When the crushing blade 5 rotates reversely for grinding, a chamfer portion of the crushing blade 5 is in contact with a chamfer portion at the edge of the sharpening stone 11, and the Y-shaped tool rest 4 is pushed to move reversely to prevent the occurrence of blade collision. After the grinding of the crushing blade 5 is finished, the thickness of the crushing blade 5 is reduced, the spring A 7 is used to apply thrust to the Y-shaped tool rest 4, the Y-shaped tool rest 4 is forced to move, such that the crushing blade 5 can always keep in close contact with the inner wall of the crushing chamber 101, and the crushing effect of the crushing blade 5 on the straw is guaranteed.

What is claimed is:

1. A straw crushing device capable of driving a sharpening structure, comprising a main housing (1), wherein the main housing (1) is internally provided with a crushing chamber (101) and a suction chamber (103), a feeding nozzle (2) is installed outside the main housing (1), and the feeding nozzle (2) communicates with a feeding end of the crushing chamber (101); a spline transmission shaft (3) is installed inside the main housing (1), and penetrates through the crushing chamber (101) and the suction chamber (103); a driving motor (6) is installed outside the main housing (1), and is connected to the spline transmission shaft (3); a Y-shaped tool rest (4) is installed on the spline transmission shaft (3), and is located in the crushing chamber (101); a crushing blade (5) is installed on the Y-shaped tool rest (4), and is attached to an inner wall of the crushing chamber (101); an impeller (8) is installed on the spline transmission shaft (3), and is located in the suction chamber (103); a guide frame (9) is installed on an outer side of the main housing (1), and a movable assembly plate (10) is installed inside the guide frame (9); a sharpening stone (11) is installed on one side of the movable assembly plate (10), and an edge of the sharpening stone (11) is chamfered; an adjusting nut (13) is installed on the movable assembly plate (10); an outer side of the crushing chamber (101) is provided with a movable opening (1011), and the guide frame (9) is located at the movable opening (1011); three slide holes (901) are arranged in the guide frame (9) in a line, and two guide slide bars (1001) are arranged on one side of the movable assembly plate (10); the guide slide bars (1001) are slidably connected into the sliding holes (901), and the sharpening stone (11) slides in the movable opening (1011); one side of the movable assembly plate (10) is provided with a screw (1002), the screw (1002) penetrates through the slide hole (901), and the screw (1002) is sleeved with a spring B (12); one end of the spring B (12) is in contact with the movable assembly plate (10), and the other end of the spring B (12) is in contact with an inner side of the guide frame (9); the adjusting nut (13) is threaded to the external of the screw (1002), and the adjusting nut (13) is in contact with an outer side of the guide frame (9); the center of the Y-shaped tool rest (4) is provided with a spline movable hole (401), and the Y-shaped tool rest (4) is slidingly connected to the spline transmission shaft (3) by means of the spline movable hole (401); and the spline transmission shaft (3) is sleeved with a spring A (7), the spring A (7) is located in the crushing chamber (101), one end of the spring A (7) is in contact with the Y-shaped tool rest (4), and the other end of the spring A (7) is in contact with the spline transmission shaft (3).

2. The straw crushing device capable of driving a sharpening structure according to claim 1, wherein the Y-shaped tool rest (4) is rotatably connected into the crushing chamber (101), three crushing blades (5) are fixedly connected to the Y-shaped tool rest (4) by bolts in an annular manner, and are in slide contact with the inner wall of the crushing chamber (101); and one side of each crushing blade (5) is sharp, and the other side of the crushing blade (5) is chamfered.

3. The straw crushing device capable of driving a sharpening structure according to claim 1, wherein the main housing (1) is internally provided with a discharge channel (102), and a discharge end at the bottom of the crushing chamber (101) communicates with a feeding end of the suction chamber (103) by means of the discharge channel (102).

4. The straw crushing device capable of driving a sharpening structure according to claim 1, wherein the impeller (8) is rotatably connected into the suction chamber (103).

* * * * *